United States Patent [19]

Keeney

[11] 4,180,842
[45] Dec. 25, 1979

[54] TIMER CIRCUIT FOR USE IN PROTECTIVE RELAYING APPLICATIONS

[75] Inventor: Marvin F. Keeney, Springfield, Pa.

[73] Assignee: General Electric Company, Philadelphia, Pa.

[21] Appl. No.: 905,603

[22] Filed: May 12, 1978

[51] Int. Cl.² .............................................. H02H 3/26
[52] U.S. Cl. .................................... 361/85; 307/293; 361/94; 361/196
[58] Field of Search ....................... 361/85, 86, 87, 94, 361/96, 93, 95, 196, 79, 89, 31, 24; 307/293; 328/127, 129, 133, 142, 144

[56] References Cited

U.S. PATENT DOCUMENTS

| | | | |
|---|---|---|---|
| 3,303,359 | 2/1967 | Brisay, Jr. | 307/263 |
| 3,590,326 | 6/1971 | Watson | 361/96 |
| 3,604,995 | 9/1971 | Jensen | 318/341 |
| 3,678,355 | 7/1972 | Bucek et al. | 318/756 |
| 3,745,373 | 7/1973 | Jones et al. | 307/228 |
| 3,757,230 | 9/1973 | Keeney | 325/28 |
| 3,772,533 | 11/1973 | Bruckner et al. | 307/261 |
| 3,876,914 | 4/1975 | Lukas | 361/196 |
| 3,889,197 | 6/1975 | Duff | 307/293 X |
| 3,914,623 | 10/1975 | Clancy | 307/229 |
| 3,932,771 | 1/1976 | Bucek et al. | 307/265 |
| 4,001,698 | 1/1977 | Allred | 328/127 X |
| 4,030,022 | 6/1977 | Bird | 363/161 |
| 4,034,269 | 7/1977 | Wilkinson | 361/79 |

OTHER PUBLICATIONS

GEK-34158 Printed Circuit Cards for MOD III "Static Relay Equipment," dated 9-76, pp. 16-18 and section "T."

*Primary Examiner*—Patrick R. Salce
*Attorney, Agent, or Firm*—William Freedman; Carl L. Silverman

[57] ABSTRACT

The timer circuit includes ramping circuit means for producing a substantially linear ramping voltage output signal. Control circuit means is provided for receiving a timer input signal and controlling the ramping circuit means wherein the presence of the timer input signal causes the ramping voltage output signal to ramp with a positive slope. Level detector circuit means is coupled to the ramping voltage circuit means to receive the ramping voltage output signal and to produce a level detector output signal when the positively ramping voltage output signal is of a predetermined threshold. The level detector output signal continues as long as the timer input signal continues and is coupled back to the control circuit means. The presence of the level detector signal develops a truncating signal which causes the positively ramping voltage output signal to truncate. When the timer input signal terminates, the ramping voltage output signal ramps negatively and the level detector signal terminates. Output circuit means is coupled to receive the level detector output signal. The output circuit means produces the timer circuit output signal. The timer circuit output signal continues as long as the level detector output signal continues and for a predetermined dropout time after the level detector output signal terminates.

19 Claims, 19 Drawing Figures

TIMER CIRCUIT FOR USE IN PROTECTIVE RELAYING APPLICATIONS

BACKGROUND OF THE INVENTION

This invention relates to a timer circuit for use in protective relaying applications, and more particularly to such a circuit suitable for use in three phase a-c power system applications.

As a result of advancements in solid state technology, static protective relays have been developed. Exemplary circuits for phase comparator type static relays are disclosed in U.S. Pat. No. 4,034,269, entitled, "Protective Relay Circuit", issued July 5, 1977, this patent hereby incorporated by reference in the present application. In the phase comparator method of measurement, the relay operates by measuring the angle between two or more phasors derived within the relay. For example, as discussed more fully in U.S. Pat. No. 4,034,269, (see FIG. 6), in one form of such phase comparator method of operation, phase coincidence circuitry provides an output signal when phase coincidence exists between a polarizing signal, $V_{AB}$, and an operating signal, $I_{AB}Z_R - V_{AB}$. An integrating timer receives the phase coincidence output signal and produces a timer output signal which operates a trip coil when phase coincidence occurs for a predetermined minimum time. Within the intended reach of the relay, for 60 hertz applications, such phase coincidence is greater than $\frac{1}{4}$ cycle (4.167 ms). Hence, the operate time, or pickup time, of the timer is ordinarily set to operate on an input block width of 4.167 ms. The timer also includes circuitry for providing a dropout time delay to reset following the termination of one such operate time. Such timers are generally diagrammatically designated to include both pickup and dropout information. For example, in the designation, 4/5, the top number, 4, would represent the time delay pickup in milliseconds, while the bottom number, 5, is the drop-out time delay, also in milliseconds. In this case, if a continuous phase coincidence signal of 4ms or more is present, a timer output signal is produced. When the phase coincidence signal is removed, the timer output signal continues for the dropout time of 5 ms. If no phase coincidence input signal is present for more than 4 ms, no timer output signal is produced. It is to be noted that the number 4 is for convenience; it actually represents the number 4.167 ms.

Presently available timer circuits for protective relay applications generally include an RC circuit for providing the necessary time delay for pickup and/or dropout. For example, one such relay timer circuit is disclosed in column 8, line 49, through column 10, line 20 and shown in FIG. 5 of the previously referenced U.S. Pat. No. 4,034,269. Further information on such relay timer circuits can be found in, "Printed Circuit Cards for MOD III Static Relay Equipment for Use in Static Line Relays", Instructions GEK-34158A, available from Power Systems Management Department, General Electric Company, Philadelphia, Pa.

In such an RC type timer circuit, the timing process is necessarily accomplished through ramping voltage signals which ramp up and down in an exponential manner. This means that, if the phase coincidence signal to such a timer has a short time duration "gap" between input blocks, such a timer is likely to be rapidly reset through its exponentially ramping voltage signal. As a result, such a timer is not responsive to the input block before the "gap". It is to be noted that such short time duration "gaps", or "holes", are expected to occur in many relay applications where phase comparator operation is employed. Accordingly, it would be desirable if the timer circuit were responsive to the blocks before and after such time "gaps". That is, it would be desirable if, in pickup operation, the timer circuit had the capability to integrate the blocks before and after such time "gaps". Another difficulty with presently available timer circuits is found in relay applications involving three phase a-c power systems. In such three phase power system applications, it is normally necessary to provide a separate timer circuit for each phase. Further, it is also generally necessary to provide timer adjustment circuitry for each of the separate three phase timers. For example, three variable resistors may be provided for each phase of the three phase system to provide adjustment of the following: transient pickup time, steady state pickup time, and dropout time. This would require the use of nine such variable resistors. Cost considerations and space limitations make such a circuit undesirable. Further, nine such variable resistors require considerable testing and setting time.

Accordingly, it is a general object of this invention to provide a timer circuit for a protective relay circuit in which the timer includes ramping circuit means for producing a substantially linear voltage output signal.

It is another object of this invention to provide such a timer circuit in which, if the timer has a short time duration "gap" in its phase coincidence signal, the timer is only partially reset so as to be responsive to the effect of the blocks before and after such "gaps".

It is another object of this invention to provide such a timer circuit for a three phase power system in which some circuitry is shared between all three phases to respectively permit single simultaneous adjustment for all three phases of one or more of the following: transient pickup time; steady state pickup time; and dropout time.

SUMMARY

In carrying out one form of my invention, I provide a timer circuit for a protective relay circuit. The relay circuit is of the type employing phase comparator operation including coincidence circuit means for producing a first output signal representative of the phase coincidence of at least two input signals thereto.

The timer circuit produces a timer output signal when the first output signal is of a predetermined duration. The timer output signal continues as long as the phase coincidence continues and for a predetermined dropout time after the phase coincidence terminates.

The timer circuit includes ramping circuit means for producing a substantially linear ramping voltage output signal. The timer circuit also includes control circuit means for controlling the ramping circuit means wherein the ramping voltage output signal is caused to ramp with a positive slope or with a negative slope, or to truncate. The control circuit means is coupled to the coincidence circuit means to receive the first output signal representative of the phase coincidence. Level detector circuit means is coupled to the ramping circuit means to receive the ramping voltage output signal. The level detector circuit means produces a level detector output signal when the ramping voltage output signal is of a predetermined threshold value. The level detector output signal continues as long as the phase coincidence continues. The level detector output signal is coupled to the control circuit means wherein the presence of the level detector output signal develops a truncating signal which causes the ramping voltage signal to truncate. Output circuit means is coupled to the level detector circuit means to receive the level detector output signal. The output circuit means produces the timer output signal. The timer output signal continues as long as the level detector output signal continues and for the predetermined dropout time after the phase coincidence terminates.

BRIEF DESCRIPTION OF THE DRAWING

My invention will be more fully understood and its several objects and advantages further appreciated by referring now to the following description, taken in conjunction with the accompanying drawings, wherein.

DETAILED DESCRIPTION OF THE INVENTION

Figure 1:
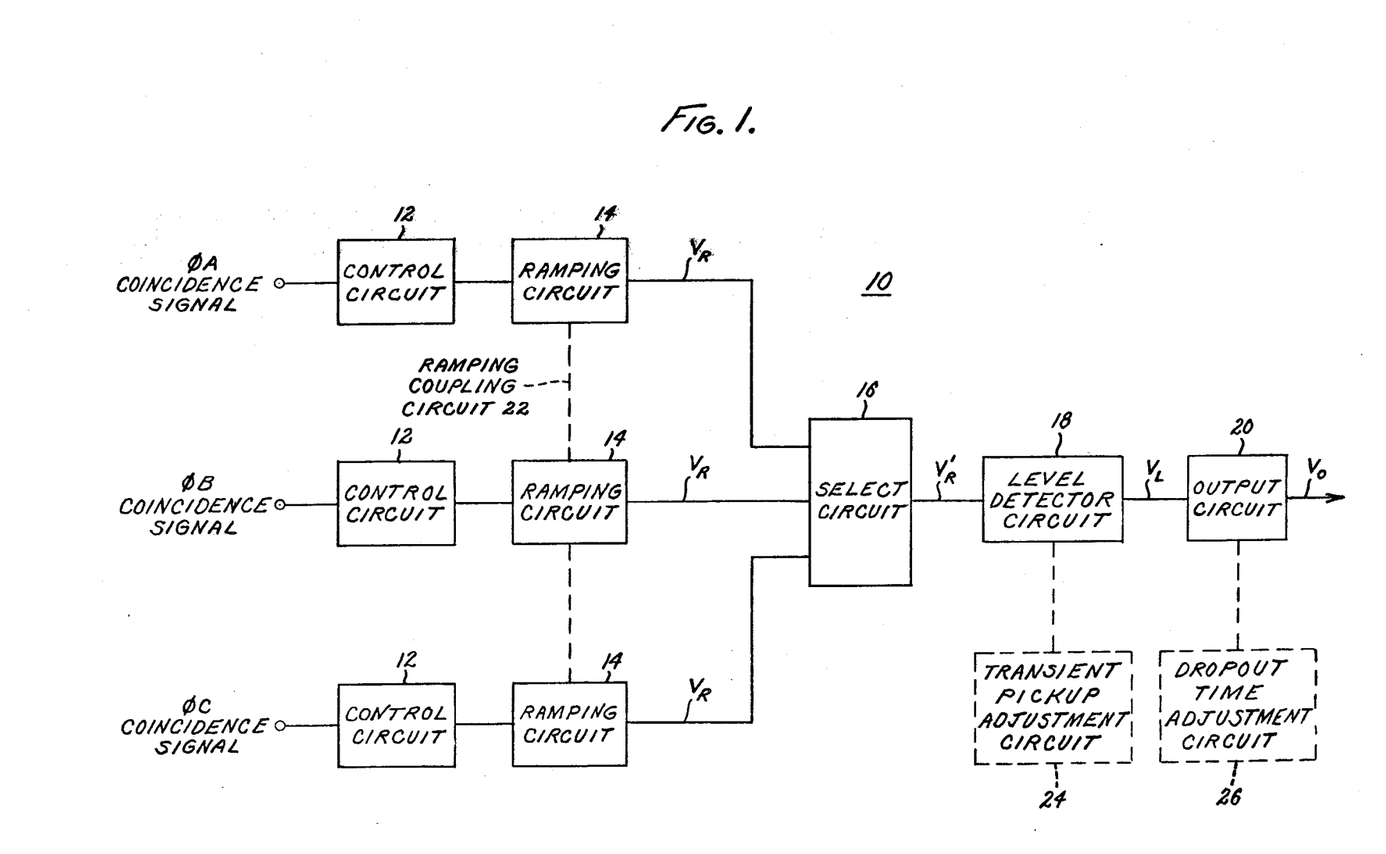
FIG. 1 is a functional block diagram showing one form of three phase protective relay timer circuit of the present invention.

Referring initially to FIG. 1, one form of three phase protective relay timer circuit of the present invention is generally designated 10. The timer circuit 10 receives input signals representative of the phase coincidence for each phase A, B, and C. As is known in the art, the time duration of phase coincidence of several signals is employed in the phase comparator mode of relay operation. Generally, the phase coincidence signal is in block form. Each of the phase coincidence signals is respectively fed into control circuit 12 which controls the condition of ramping circuit 14 wherein, when such phase coincidence is initiated, the ramping circuit 14 produces a substantially linear positive ramping voltage signal $V_R$, i.e., a ramping voltage with a substantially constant positive slope. When such phase coincidence signal is terminated, the ramping circuit 14 produces a substantially linear negative ramping voltage $V_R$, i.e., a ramping voltage with a substantially constant negative slope. Between the positive and negative ramping voltage portions, the ramping circuit 14 sometimes produces a truncated waveform.

The ramping voltage $V_R$ for each phase coincidence signal is fed into a select circuit 16 which allows the ramping voltage $V'_R$ of highest positive value to pass therethrough as an output signal $V'_R$, of the select circuit 16. The high ramping voltage $V'_R$ is fed into level detector circuit 18 which produces an output signal $V_L$ when the $V'_R$ ramping signal reaches a predetermined threshold value which is representative of a time period (e.g., 5.5 ms for many relay applications) for which a timer pickup output signal is desired following a single pulse input. This time period is generally referred to as transient or, pulse pickup time. The level detector output signal $V_L$ is fed into output circuit 20 which produces a pickup output signal $V_O$ as long as the level detector signal $V_L$ is present and for a predetermined dropout time period after the level detector signal $V_L$ is terminated.

In a preferred form of a three phase timer circuit of the present invention, ramping coupling circuit 22, transient pickup adjustment circuit 24, and dropout time adjustment circuit 26 are provided, as shown in dashed lines. Such circuits respectively provide single simultaneous adjustment for all three phases of one or more of the following: transient pickup time; steady state pickup time; and dropout time.

Figure 2:
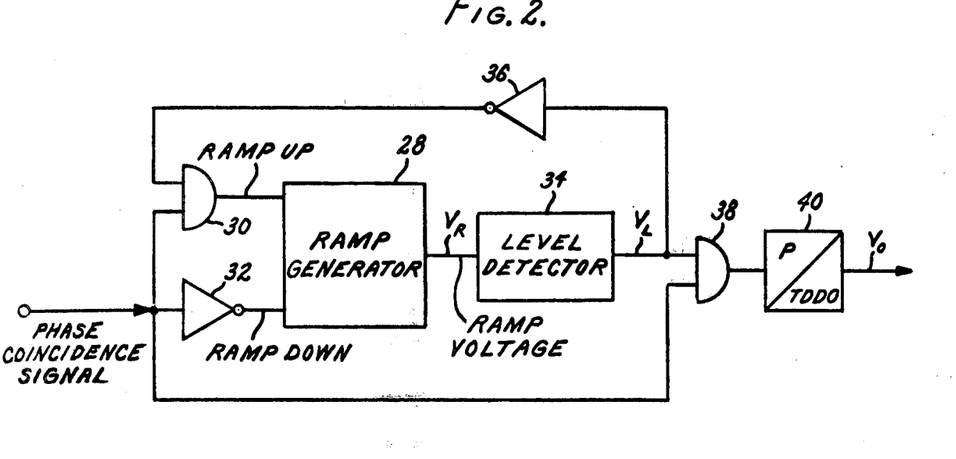
FIG. 2 is a block diagram of one phase of the timer circuit of FIG. 1.

Referring now to FIGS. 2 and 3A-3D, a functional block diagram of one phase of the three phase timer of FIG. 1 and its timing diagram will be discussed. In FIG. 2, the ramping circuit includes a ramp generator 28, which may comprise an operational amplifier. The ramp generator 28 is coupled to receive ramp up and ramp down input signals respectively through first AND gate 30 and inverter 32, each of which receives the phase coincidence signal as an input. The ramping generator 28 produces a ramp voltage signal $V_R$ which is fed into level detector 34. The output signal, $V_L$, of the level detector 34 is fed back through inverter 36 to the first AND gate 30 and also to a second AND gate 38. The second AND gate 38 also receives the phase coincidence signal which is the input signal to the timer circuit. The output of the second AND gate 38 is fed into an instantaneous pickup (P/time delay dropout (TDDO) 40, whose output $V_O$ represents the output of the timer circuit.

Figure 3:
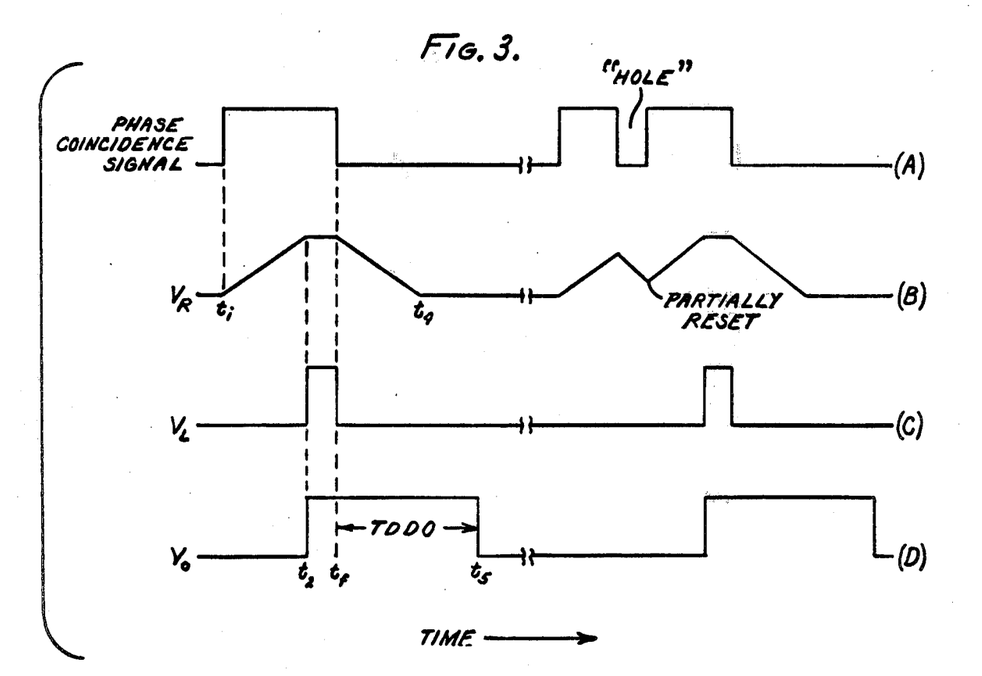
FIGS. 3A-3D represent a timing diagram for the one phase timer circuit of FIG. 2.

The timing diagram of FIGS. 3A-3D will now be discussed. For purposes of convenience in the present description, when a signal is not in existence, it will generally be referred to as being "low". Similarly, for purposes of convenience, when a signal is in existence, it will generally be referred to as being "high". The timing diagrams of FIGS. 3A-3D show that, when the phase coincidence signal to the timer circuit goes "high" (phase coincidence), ramp generator 28 produces a positive going voltage ramp, $V_R$. That is, at time $t_i$ of FIGS. 3A, 3B, the ramp voltage $V_R$ goes linearly positive. When this positive ramp voltage $V_R$ reaches the threshold voltage of the level detector 34 (at time $t_2$), the ramp voltage, $V_R$, is truncated (FIG. 3B) because of the upper input to AND gate 30, and the instantaneous pickup, time delay dropout timer 40 produces its output signal $V_O$ (FIG. 3D). The output signal $V_O$ continues as long as the phase coincidence signal is "high", i.e., until $t_f$, and for a time ($t_f$ to $t_5$ in FIG. 3D) equal to the dropout time (TDDO) after the phase coincidence signal goes "low". When the phase coincidence signal goes "low", the ramp generator 28 produces a linear negatively going voltage $V_R$ and the level detector output signal $V_L$ goes "low".

It is important to note that the use of the substantially linear ramping voltage in the timer circuit of the present invention is highly desirable in that, in the event of "gaps" or "holes" between input signal blocks, the timer circuit is responsive to the blocks before and after such "holes". For example, if the timer input has a short time duration "gap" or "hole" between blocks, as shown in FIG. 3A, the timer is only partially reset, and integrates the effects of the block before and the block after the "gap". The timing diagram of FIGS. 3A–3D will be discussed in more detail at a later point in the description of the present invention.

Figure 4:
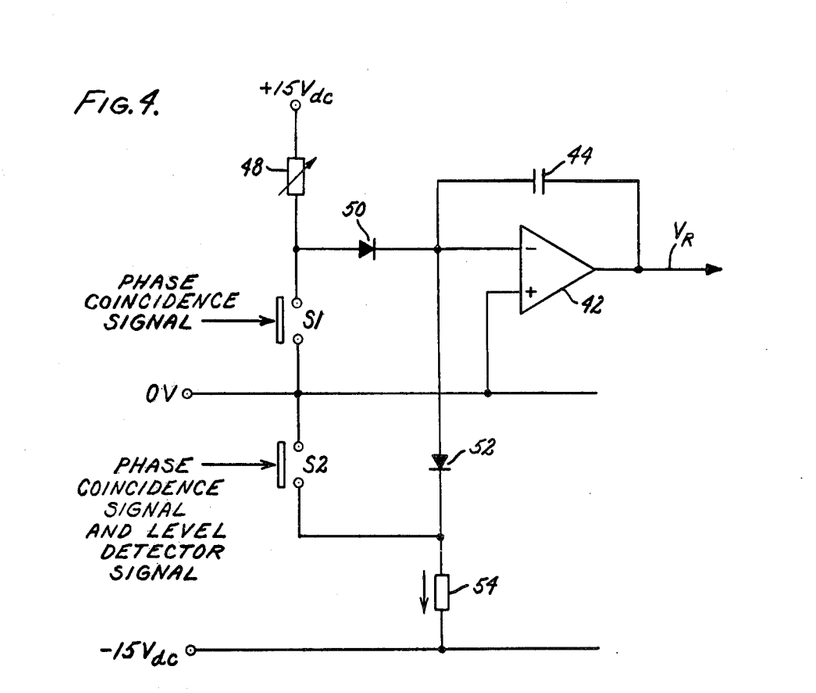
FIG. 4 is a simplified circuit diagram showing one form of control and ramping circuit configuration suitable for use in the timer circuit of FIGS. 1 and 2.

Referring now to FIG. 4, prior to describing a preferred three phase timer circuit of the present invention in detail, a portion of the block diagram of FIG. 2 is shown in simplified circuit form. In FIG. 4, a ramp generator circuit includes an operational amplifier 42 with an integrating capacitor 44 coupled between the output and the inverting input (−) of the operational amplifier 42. The non-inverting input (+) of the operational amplifier 42 is coupled to zero potential (ground). A positive dc source, e.g., +15V, is coupled to ground through a variable resistor 48 and a series connected switch, simply designated S1. A tap between the variable resistor 48 and the switch S1 is coupled through a diode 50 to the inverting input (−) of the operational amplifier 42. A tap between diode 50 and the inverting input (−) of the operational amplifier 42 is coupled to a negative source, e.g., −15V dc, through a diode 52 and a resistor 54. A tap between the diode 52 and resistor 54 is coupled through a second switch, simply designated as S2, to zero potential (ground).

In the circuit shown in FIG. 4, the switch S1 is responsive to the phase coincidence signal and is open when no phase coincidence exists, i.e., phase coincidence signal is "low", and closed when phase coincidence exists, i.e., phase coincidence signal is "high". Switch S2 is responsive to the phase coincidence signal and to the level detector output signal and is open only when phase coincidence exists, i.e., "high" phase coincidence signal, and the threshold level has not been attained, i.e., level detector output signal is "low". It is to be noted that the switches S1 and S2 have been simply shown to this point. At a later point in this description, specific preferred solid state switch configurations will be discussed.

The operation of the circuit of FIG. 4 is as follows: For a given block phase coincidence signal ("high"), beginning at time $t_i$ of FIG. 3A, switch S1 is closed and switch S2 is open as long as the level detector produces no output signal, i.e., level detector output signal is "low". This causes diode 50 to be off or, non conducting, as its anode is clamped to zero volts. With diode 50 off, the current direction (arrow) is to the negative dc source from the inverting input (−) of the operational amplifier 42 through the diode 52 and resistor 54, causing current to flow into the right hand terminal of capacitor 44. This causes the operational amplifier 42 to develop a substantially linear positive ramping output $V_R$. This positive ramping continues until the level detector signal $V_L$ goes "high", at which time ($t_2$), switch S2 closes. The closing of switch S2 causes the cathode of diode 52 to be clamped to zero volts (ground) where it goes to off position and no longer conducts. With the diode 52 non-conductive and the phase coincidence input signal still "high", there is no longer any current flowing into capacitor 44. This causes the positive ramping to terminate wherein the ramping voltage $V_R$ truncates (FIG. 3B). When the level detector signal $V_L$ goes "low" at time $t_f$ (see FIGS. 3A–3C), switch S1 now opens, forward biasing diode 50 so the current through variable resistor 48 flows into the left hand terminal of capacitor 44, causing the operational amplifier 42 to ramp negatively. The above operation is summarized in Table I below.

TABLE I

| Phase Coincidence Input Signal | Level Detector Output Signal | Switch S1 | Switch S2 | $V_R$ |
|---|---|---|---|---|
| "high" | "low" | Closed | open | Ramp Positive |
| "high" | "high" | closed | closed | Ramp Truncate |
| "low" | "low" | open | closed | Ramp Negative |

Figure 5:
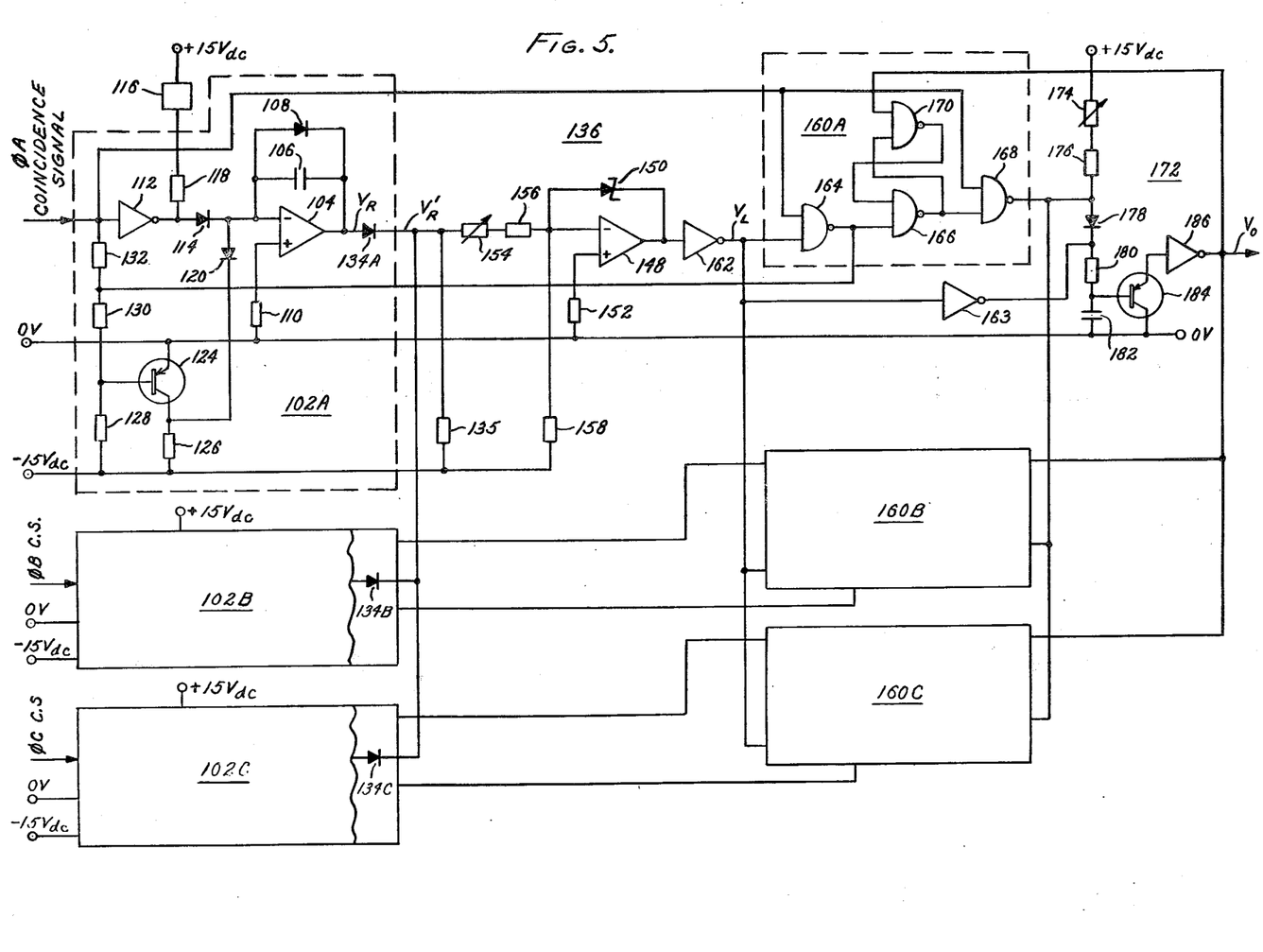
FIG. 5 is a more detailed circuit diagram of a preferred form of the three phase protective relay timer circuit of FIG. 1.

Referring now to FIG. 5, a preferred three phase timer circuit of the present invention, generally designated 100, will be described in more detail. The circuit 100 includes a ramping and ramping control circuit 102A which receives the phase A coincidence signal. The circuit 102A includes an operational amplifier 104 coupled to an integrating capacitor 106 and a clamping diode 108 (see also the simplified circuit of FIG. 4). The non-inverting input (+) of the operational amplifier 104 is coupled to zero potential (ground) through resistor 110. The phase A coincidence signal is coupled to the inverting input (−) of the operational amplifier 104 through an inverter 112 and diode 114. It may be helpful to note that inverter 112 corresponds to switch S1 of FIG. 4. A positive dc source, e.g., +15 V dc, is coupled between the outputs of inverter 112 and the anode of diode 114 through steady state pickup adjustment circuit 116. A tap between the cathode of diode 114 and the inverting input (−) of operationa amplifier 104 is coupled to zero potential (ground) through diode 120 and switching PNP transistor 124. It may be helpful to note that transistor 124 corresponds to switch S2 of FIG. 4. The collector of switching transistor 124 is coupled to a negative dc source, e.g., −15 V dc, through resistor 126. The base of switching transistor 124 is coupled between the −15 V dc source and the input to inverter 112 through resistors 128, 130 and 132. The output $V_R$ of operational amplifier 104 is coupled through diode 134A to level detector circuit 136. The phase B, phase C circuits 102B, 102C, corresponding to circuit 102A are shown in block form as they are substantially identical to circuit 102A but include output diodes 134B, 134C. The output diodes 134A, 134B, 134C and a resistor 135, are disposed so as to allow the largest value $V'_R$ of the three phases to pass therethrough.

Figure 5A:
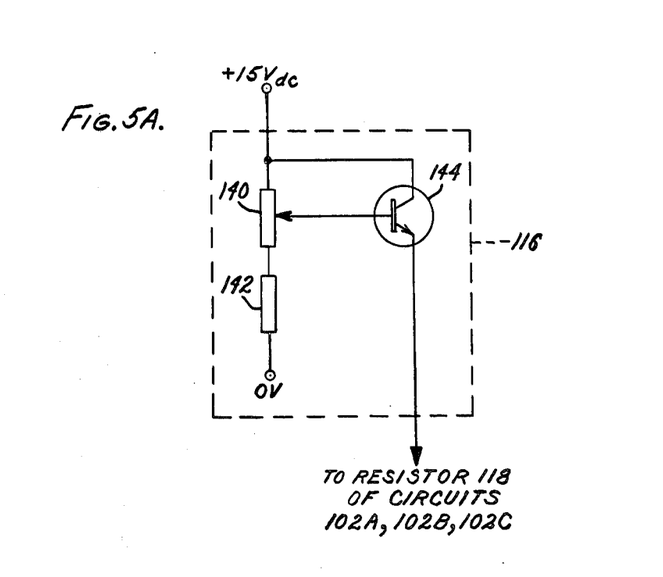
FIG. 5A is a detailed circuit diagram of one portion of the circuit diagram shown in FIG. 5.
Figure 6:
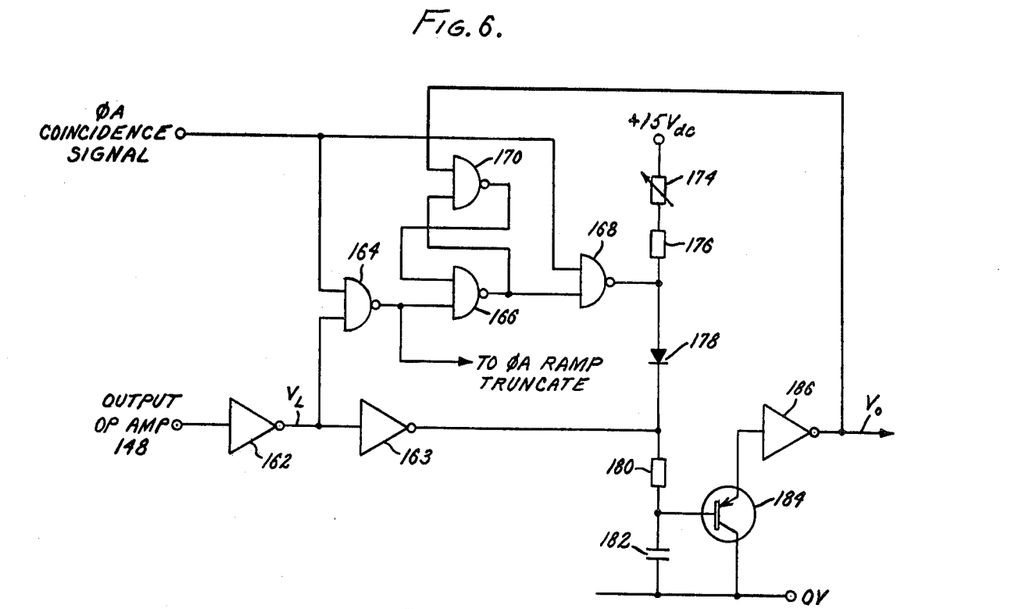
FIG. 6 is another portion of the circuit diagram shown in FIG. 5.

The steady state pickup adjustment circuit 116 is shown in more detail in FIG. 5A. More particularly, a +15 V dc source is coupled to zero potential through a pair of resistors 140, 142. Resistor 140 is a variable resistor. A NPN transistor 144 has its base coupled to the +15 V dc source through a tap on the variable resistor 140. The signal appearing at the emitter of transistor 144 is the output of steady state pickup adjustment circuit 116 and is commonly provided to each of the other circuits 102B, 102C.

Referring again to FIG. 5, the level detector circuit 136 will be described. The level detector circuit 136 includes an operational amplifier 148 with a zener diode 150 coupled between its inverting input (−) and its output. The non-inverting input (+) is coupled to zero potential (ground) through resistor 152. The output signal $V_R'$ of the circuits 102A, 102B, 102C is coupled to the inverting input (−) of operational amplifier 148 through resistors 154, 156, with resistor 154 being variable. A resistor 158 is connected between resistor 156 and the inverting input (−) of operational amplifier 148 and coupled to −15 V dc. The output signal of the operational amplifier 148 is coupled to phase logic circuit 160A through an inverter 162. For purposes of clarity of description, the output signal of the inverter 162 is referred to as the level detector output signal $V_L$. The output signal $V_L$ is also coupled to output circuit 172 through inverter 163.

The phase logic circuit 160A includes four 2-input NAND gates 164, 166, 168, 170 disposed in a flip-flop configuration where an input of NAND gate 164 is coupled to the output of inverter 162 and an input of NAND gate 170 is coupled to the output signal $V_O$ of the output circuit 172. The output of the NAND gate 168 represents the output of the phase logic circuit 160A.

The timer output circuit 172 includes resistors 174, 176, 180, diode 178, and capacitor 182 coupled between positive dc source, e.g., +15 V dc, and zero potential. A PNP switching transistor 184 has its base coupled between resistor 180 and capacitor 182 and its collector coupled to zero potential. The output of inverter 163 is coupled between diode 178 and resistor 180. The emitter of the transistor 184 is coupled to the input of an inverter 186. The output $V_O$ of the inverter 186 represents the timer circuit output signal. The timer output signal $V_O$ is coupled back to an input of NAND gate 170.

OPERATION OF THE CIRCUIT 100 SHOWN IN FIGS. 5, 5A

When the phase A coincidence signal goes "high", the output of inverter 112 goes "low", causing diode 114 to be reverse biased. Also, PNP transistor 124 is off due to voltage divider action of resistors 128, 130 and 132. Under these conditions, a current flows into the right hand terminal of capacitor 106 through diode 120 and resistor 126 to the −15 V dc source. This current flow causes the output $V_R$ of the operational amplifier 104 to linearly ramp positive. The slope of the linear ramp is determined by 15/RC, where: R=the resistance of resistor 126; and C=the capacitance of capacitor 106. The foregoing operation is also applicable to circuits 102B, 102C under phase B, C coincidence conditions.

The diodes 134A, 134B, 134C, and resistor 135, are in a configuration which allows only the largest value voltage ramping signal $V_R'$ to pass into the level detector circuit 136. The level detector circuit 136 produces a level detector output signal $V_L$, i.e., $V_L$ goes "high", only when the voltage ramping signal $V_R'$ is of a predetermined magnitude. This predetermined magnitude corresponds to a desired time duration, i.e., transient pickup time, after which relay operation, or pickup, is required. As previously mentioned, for purposes of clarity of description, the output signal of inverter 162 is referred to as the level detector output signal $V_L$. The level detector output signal $V_L$ is directed to the phase logic circuit 160A and to timer output circuit 172.

Referring briefly now to the operation of the phase logic circuit 160A. When the level detector output signal $V_L$ goes "high", the output of NAND gate 164 goes "low". The output of NAND gate 164 is coupled back between voltage divider resistors 132 and 130. As a result of such coupling, transistor 124 turns on, reverse biasing diode 120 and terminating the current that had been flowing into capacitor 106. This causes the positively ramping voltage $V_R$ of FIG. 3B to truncate.

Also, when, and following the time at which the threshold level has been attained, the level detector output signal $V_L$ is "high" so the output of inverter 163 goes "low". When the output of inverter 163 goes "low", capacitor 182 which had been fully charged, is now discharged. The discharging of capacitor 182 causes transistor 184 to turn on. When transistor 184 turns on, the input to inverter 186 goes "low", causing the output $V_O$ of inverter 186 to go "high". Thus, as long as the level detector output signal $V_L$ is "high", a timer output signal $V_O$ is produced (FIGS. 3C, 3D).

When the phase coincidence signal goes "low" (no phase coincidence), the output of inverter 112 goes "high" and the level detector output signal $V_L$ goes "low". The "high" output of inverter 112 causes diode 114 to be forwardly biased to a conductive state. With diode 114 conductive, a current flows from steady state pickup adjustment circuit 116 into the left hand terminal of capacitor 106. As a result, the previously truncated voltage $V_R$ linearly ramps negatively. The slope of the negative ramping is determined by V/RC, where: V is the voltage (adjustable) at the emitter of transistor 144; R is the resistance of resistor 118; and C is the capacitance of capacitor 106. It is important to appreciate that this linear negative ramping is advantageous as compared to exponential type negative ramping, as previously discussed in connection with FIGS. 3A–3D.

The effect of the negative ramping voltage and the "low" level detector output signal $V_L$ on the operation of the timer output circuit 172 is as follows: When the level detector signal $V_L$ is "low", the dropout time circuit becomes operable. More particularly, when the voltage level detector signal $V_L$ goes "low", transistor 184 turns off following a predetermined time. This predetermined time corresponds to the time for charging the previously discharged capacitor 182. When transistor 184 turns off in response to the charge on capacitor 182, the emitter of transistor 184 goes "high", causing the output signal $V_O$ of the inverter 186 to go "low" (FIGS. 3C, 3D).

PHASE LOGIC CIRCUIT

An important feature of the phase logic circuits 160A, 160B, 160C, will now be discussed. In order to simplify the description, reference will be taken to FIGS. 6 and 7A–7H which represents a portion of the three phase timer circuit 100 of FIGS. 5, 5A and a timing diagram therefor.

Figure 7:
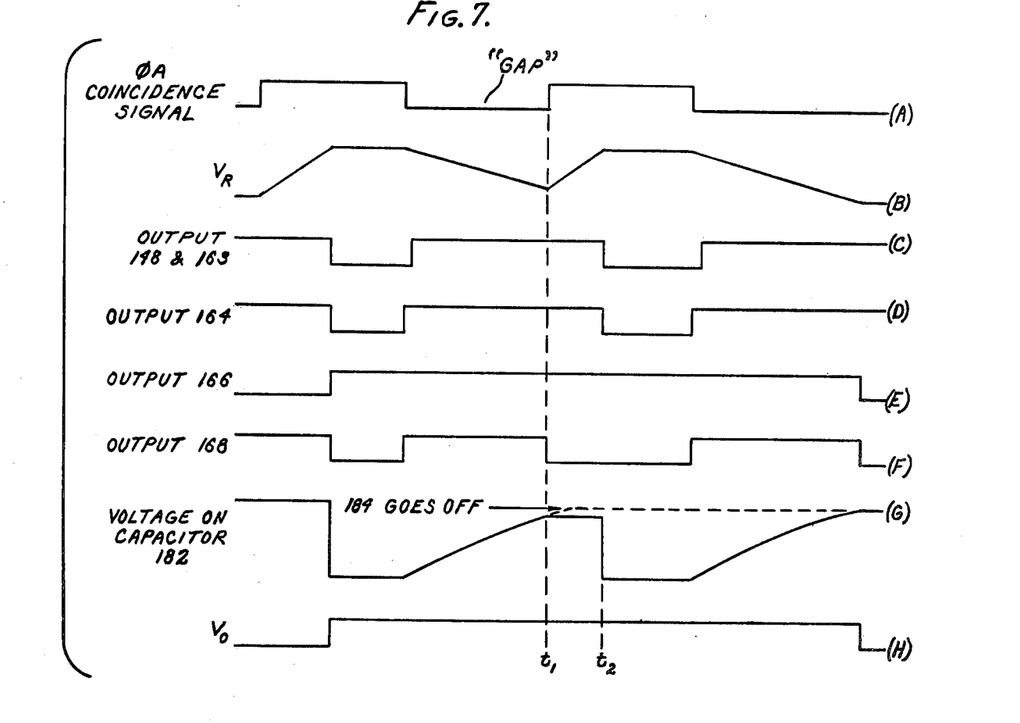
FIGS. 7A-7H represent a timing diagram for the timer circuit of FIGS. 5, 5A, and 6.

An important feature of the phase logic circuits 160A, 160B, 160C is to provide an extension of dropout time when the phase coincidence signal which initiated a timer output signal $V_O$ reappears after a "gap" or "hole". In FIGS. 7A–7H, after the phase coincidence signal initiates a timer output signal $V_O$, such a "gap" is shown. Following the "gap", the phase coincidence signal reappears. Without the phase logic circuits 160A, 160B, 160C, as shown in FIGS. 7A, 7G, 7H, the timer output signal $V_O$ would undesirably drop out some time between time $t_1$ and time $t_2$. That is, as the voltage on the capacitor 182 exponentially increased to its charged value, it reaches a level at which point transistor 184 goes off, causing the timer output signal $V_O$ to dropout. This is shown in dashed lines in FIG. 7G.

The presence of the phase logic circuits 160A, 160B, 160C prevent continued charging of capacitor 182 when the phase coincidence signal reappears. This effectively extends the dropout time for the case of the reappearing phase coincidence signal. It is to be appreciated that other means of lengthening the dropout time are available but are not generally appropriate to this reappearing phase coincidence signal situation. The presence of the phase logic circuits 160A, 160B, 160C allows the dropout time to be set shorter, for example, 5 ms instead of 9 ms for typical conditions with the dropout time being extended for the reappearing phase coincidence situation above described.

ADJUSTMENT OF TIMER OPERATION

Transient Pickup Time

Transient pickup time is generally defined as the pickup time for a single pulse input. For most applications, for 60 hertz systems, the transient time is set at 5.5 ms.

A single simultaneous adjustment of such transient pickup time for the three phases is provided by variable resistor 154 (see FIG. 5). That is, variable resistor 154, which is common to all three phases, is adjustable to provide desired threshold levels at which the level detector output signal $V_L$ will go "high". For example, by increasing the value of the variable resistor 154, the transient pickup time can be increased. Conversely, by decreasing the value of the variable resistor 154, the transient pickup time can be decreased.

Steady State Pickup Time

Steady state pickup time is generally defined as the pickup time for a train of input signals. For most 60 hertz applications, the steady state pickup time is set at 4.167 ms.

A single simultaneous adjustment of such steady state pickup time for the three phases is provided by variable resistor 140 (see FIG. 5A). This variable resistor 140 is common to circuits 102A, 102B, and 102C. More particularly, increasing the tapped voltage on the variable resistor 140 increases the slope of the negatively ramping voltage. This increases the steady state pickup time. Conversely, decreasing the tapped voltage on the variable resistor 140 causes the steady state pickup time to decrease.

Dropout Time

Dropout time is generally defined as the time delay to reset following the termination of one operate time. For most 60 hertz applications, the dropout time is set at 5 ms.

A single simultaneous adjustment of such dropout time for the three phases is provided by variable resistor 174 (FIG. 5). The dropout time is determined by the time needed to charge capacitor 182 to a level at which transistor 184 turns off. More particularly, the charging time of capacitor 182 is a function of the resistance between the +15 V dc source and the capacitance of capacitor 182. Therefore, adjusting the value of resistor 174 allows one to vary this charging time. For example, increasing the value of the resistor 174, causes the charging time, i.e., dropout time, to increase. Conversely, decreasing the value of the resistor 174 causes the charging time, i.e., dropout time, to decrease.

OTHER EMBODIMENTS

For some protective relaying applications, the three phase timer circuit of the present invention shown previously with a common timer output circuit 172 may include separate timer output circuits for each phase. For example, as shown in FIG. 8, a portion of one such three phase timer circuit 200 may include three separate timer output circuits 172A, 172B, 172C for the respective phases A, B, C.

Figure 8:
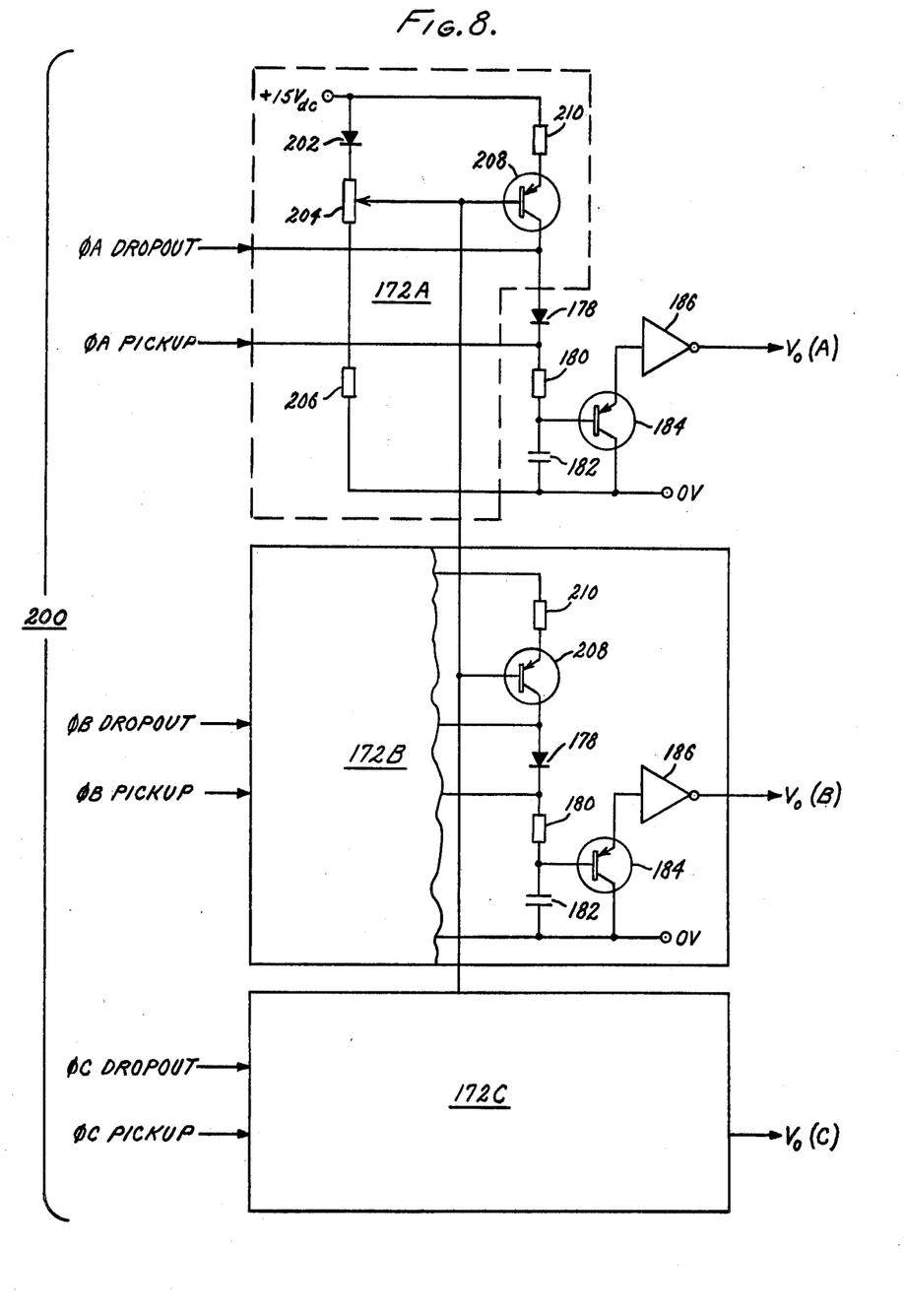
FIG. 8 is a portion of a circuit diagram of another form of three phase timer circuit of the present invention.

The circuit 200 of FIG. 8 is coupled to receive separate phase input signals from ramping circuits, ramping control circuits, and a level detector circuit (not shown). Such circuits may be substantially the same as the corresponding circuits of the three phase timer circuit 100 of FIGS. 5, 5A. The separate timer output circuits 172A, 172B, 172C are similar to the common timer output circuit 172 of FIGS. 5, 5A but include several modifications thereto. One such modification (shown in dashed lines) is that resistor 176 and variable resistor 174 are replaced with a controlled current source. The controlled current source includes diode 202, variable tapping resistor 204, and resistor 206 coupled between +15 V dc and zero potential. The base of PNP transistor 208 is coupled to the tap on variable resistor 204. The emitter of transistor 208 is coupled through resistor 210 to the +15 V dc source. The collector of transistor 208 is coupled to diode 178. Diode 178 is substantially the same as diode 178 of the circuit 100 of FIGS. 5, 5A.

Each timer output circuit 172A, 172B, 172C includes AND logic (not shown) for receiving its phase coincidence signal and the level detector signal. Thus, the output of separate circuits 172A, 172B, 172C respectively corresponds to the phases A, B, C.

Further, for some protective relaying applications, a single phase timer may be desired. In such applications, one may employ the circuits 100, 200 of the present invention as hereinbefore described and utilize only the necessary portions thereof. Or, one can remove the surplus circuitry relating to the additional phases and maintain the single phase circuitry.

Also, it is to be appreciated that the timer circuit of the present invention is not limited to phase comparator type relay applications. Indeed, the timer circuit of the present invention is generally applicable to protective relay applications where an input signal is required to be timed.

GENERAL CONSIDERATIONS

In one preferred three phase timer circuit of the present invention, the timer characteristics are 5.5, 4.167/5, where: 5.5 represents the transient pickup time; 4.167 represents the steady state pickup time; and 5.5 represents the dropout time (all in ms). In order to obtain such a characteristic, various circuit element values may be employed. With the circuit configuration hereinbefore discussed (FIGS. 5, 5A), in order to ensure proper voltage divider action among resistors 128, 130, 132, it is useful to employ the following values, or ratios,: resistor 128=330 K ohms; resistor 130=100 K ohms; and resistor 132=100 K ohms.

Circuit devices which can be employed to practice the timer circuits of the present invention may include the following: operational amplifiers such as the one available from Motorola under the designation MC1458; and inverters such as the one available from Fairchild under the designation 9109.

Further, although the circuits of the present invention have been described employing certain circuit devices and circuit configurations, substitution may be made thereto. For example, PNP or NPN transistors may be interchanged as long as polarity considerations are maintained. Similarly, although the substantially linear ramping voltage has been shown as a positive type waveform, if desired, the waveform can be entirely negative. For example, the ramping voltage waveform could be as follows: commence ramping with a negative slope; truncate when the predetermined threshold value is reached; and ramp with a positive slope when the timer input signal has terminated. With such a ramping voltage waveform, the steady state pickup time of the timer circuit is related to the value of the positive slope.

While I have shown and described particular embodiments of my invention, it will be obvious to those skilled in the art that various changes and modifications may be made without departing from my invention in its broader aspects, and I, therefre, intende herein to cover all such changes and modifications as fall within the true spirit and scope of my invention.

What is claimed as new and desired to secure by Letters Patent of the United States is:

1. In a protective relay circuit employing phase comparator operation, the circuit including coincidence circuit means for producing a first output signal representative of the phase coincidence of at least two input signals thereto and timer circuit means for producing a timer output signal when the first output signal is of a predetermined duration, the timer output signal continuing as long as the phase coincidence continues and for a predetermined dropout time after the phase coincidence terminates, wherein the timer circuit means comprises:
   (a) ramping circuit means for producing a substantially linear ramping voltage output signal;
   (b) control circuit means for controlling said ramping circuit means wherein said ramping voltage output signal is caused to ramp with a positive slope or with a negative slope, or to truncate, said control circuit means coupled to the coincidence circuit means to receive the first output signal representative of the phase coincidence;
   (c) level detector circuit means coupled to said ramping circuit means to receive said ramping voltage output signal, said level detector circuit means producing a level detector output signal when said ramping voltage output signal is of a predetermined threshold value, said level detector output signal continuing as long as the phase coincidence continues; said level detector circuit means coupled to said control circuit means wherein the presence of said level detector output signal develops a truncating signal which causes said ramping voltage signal to truncate; and
   (d) output circuit means coupled to said level detector circuit means to receive said level detector output signal, said output circuit means producing the timer output signal, the timer output signal continuing as long as said level detector output signal continues and for the predetermined dropout time after the phase coincidence terminates.

2. Timer circuit means in accordance with claim 1 in which said ramping circuit means comprises a first operational amplifier with a capacitor coupled between its inverting input and its output, the non inverting input of said first operational amplifier being coupled to ground potential, and in which said control circuit means comprises coupling means for switchably coupling said inverting input to a positive voltage source for causing said negative ramping, or to a negative voltage source for causing said positive ramping.

3. Timer circuit means in accordance with claim 2 in which said control circuit means includes first variable rsistance means for adjusting the value of said negative slope of said ramping voltage output signal, said first variable resistance means coupled between said positive voltage source an said inverting input of said first operational amplifier, wherein the steady state pickup time of said timer circuit means is related to the value of said negative slope.

4. Timer circuit means in accordance with claim 3 in which said control circuit means includes an inverter for receiving said first output signal representative of the phase coincidence, said output of said inverter being coupled to said inverting input of said first operational amplifier through a first diode, the junction between said inverter and the anode of said first diode being coupled to said positive voltage source through said first variable resistance means, the junction between the cathode of said first diode and said inverting input of said first operational amplifier being coupled through a second diode and a second resistor to said negative voltage source, the junction between the cathode of said second diode and said second resistor being coupled to the collector of a PNP transistor, the emitter of said PNP transistor being coupled to ground potential, the input of said inverter being coupled to said negative voltage source through a voltage divider with the base of said PNP transistor being coupled to a first point on said voltage divider, a second point of said voltage divider being coupled to receive said truncating signal, said second point being relatively positive with respect to said first point.

5. Timer circuit means in accordance with claim 2 in which said level detector circuit means comprises a second operational amplifier with its non inverting input coupled to ground potential, the inverting input of said second operational amplifier coupled through second variable resistance means to receive said ramping voltage output signal, the junction between said inverting input of said second operational amplifier and said second variable resistance means being coupled by a third resistor to said negative voltage source, wherein the value of said second variable resistance means determines said predetermined threshold value, the transient pickup time of said timer circuit means being related to said predetermined threshold value.

6. Timer circuit means in accordance with claim 2 in which said output circuit means includes third variable resistance means coupled to a second capacitor and in which the dropout time of said timer circuit means is related to the value of said third variable resistance means.

7. A timer circuit for a protective relay circuit for a three phase a-c power system, the protective relay circuit employing phase comparator operation with coincidence circuit means respectively providing output signals for each of the three phases, each of the output signals being representative of the phase coincidence of at least two input signals to the coincidence circuit means for the respective phase, comprising:
   (a) phase one signal processing circuit means for receiving the output signal representative of the phase coincidence of phase one, including:
       (1) phase one ramping circuit means for producing a substantially linear ramping voltage output signal, and
       (2) phase one control circuit means for controlling said ramping circuit means wherein said ramping voltage output signal is caused to ramp with a positive slope or with a negative slope, or to truncate, said control circuit means coupled to receive said phase one output signal representative of the phase coincidence;

(b) phase two signal processing circuit means for receiving the output signal representative of the phase coincidence of phase two, including:
　(1) phase two ramping circuit means for producing a substantially linear ramping voltage output signal, and
　(2) phase two control circuit means for controlling said ramping circuit means wherein said ramping voltage output signal is caused to ramp with a positive slope or with a negative slope, or to truncate, said control circuit means coupled to receive said phase two output signal representative of the phase coincidence, (c) phase three signal processing circuit means for receiving the output signal representative of the phase coincidence of phase three, including:
　(1) phase three ramping circuit means for producing a substantially linear ramping voltage output signal, and
　(2) phase three control circuit means for controlling said ramping circuit means wherein said ramping voltage output signal is caused to ramp with a positive slope or with a negative slope, or to truncate, said control circuit means coupled to receive said phase three output signal representative of the phase coincidence, (d) select circuit means coupled to receive said ramping voltage output signals of said ramping circuit means of phases one, two, and three, said select circuit means producing a select output signal which is the largest value of said ramping voltage output signals of said ramping circuit means of phases one, two and three;

(e) level detector circuit means coupled to said select circuit means to receive said select output signal, said level detector circuit means producing a level detector output signal when said select output signal is of a predetermined threshold value, said level detector output signal continuing as long as the phase coincidence of the selected phase continues, said level detector circuit means coupled to said signal processing circuit means of phases one, two, and three wherein the presence of said level detector output signal develops a truncating signal which causes said ramping voltage signal of the selected phase to truncate; and (f) output circuit means coupled to said level detector circuit means, said output circuit means producing the timer output signal, the timer output signal continuing as long as said level detector output signal continues and for the predetermined dropout time after the phase coincidence of the selected phase terminates.

8. A timer circuit in accordance with claim 7 in which said ramping circuit means of phases one, two, and three each comprises a first operational amplifier with a capacitor coupled between the inverting input and its output, the non inverting input of said first operational amplifier being coupled to ground potential, and in which said control circuit means of phases one, two, and three each comprises coupling means for switchably coupling said inverting input to a positive voltage source for causing said negative ramping, or to a negative voltage source for causing said positive ramping.

9. A timer circuit in accordance with claim 8 which includes ramping coupling circuit means coupling said ramping circuit means of phases one, two, and three, said coupling circuit means including a first variable resistor coupled between said positive voltage source and said inverting inputs of each of said first operational amplifiers for simultaneously adjusting the steady state pickup time of said timer circuit for phases one, two and three.

10. A timer circuit in accordance with claim 8 in which said level detector circuit means includes a second variable resistor for determining said predetermined threshold value and simultaneously adjusting the transient pickup time of said timer circuit for phases one, two, and three.

11. A timer circuit in accordance with claim 8 in which said output circuit means includes a third variable resistor for simultaneously adjusting the dropout time of said timer circuit for phases one, two, and three.

12. A timer circuit in accordance with claim 8 in which said output circuit means comprises a common output circuit for phases one, two, and three.

13. A timer circuit in accordance with claim 8 in which said output circuit means comprises separate output circuits for phases one, two, and three.

14. In combination with a protective relay, a timer circuit for receiving at least one input signal and producing an output signal, the timer circuit providing adjustable transient pickup time, steady state pickup time, and dropout time, the timer circuit comprising:

(a) signal processing means including a first operational amplifier with a capacitor coupled between its inverting input and its output, the non inverting input of said first operational amplifier coupled to ground potential, said first operational amplifier producing a substantially linear ramping voltage output signal;

(b) control circuit means coupled to receive the input signal, said control circuit means switchably coupling said inverting input to a positive voltage source or to a negative voltage source, thereby respectively causing said ramping voltage output signal to ramp with a negative slope, or with a positive slope, said control means including first variable resistance means for adjusting the value of one of said slopes, said first variable resistance means coupled between one of said voltage sources and said inverting input, the steady state pickup time of said timer circuit being related to the value of said one slope;

(c) level detector circuit means coupled to receive said ramping voltage output signal, said level detector means producing a level detector output signal when said ramping voltage output signal is of a predetermined threshold value, said level detector output signal continuing as long as the input signal continues, said level detector circuit means coupled to said control circuit means wherein the presence of said level detector output signal develops a truncating signal which causes said ramping voltage signal to truncate, the transient pickup time of said timer circuit being related to said predetermined threshold value; and (d) output circuit means coupled to said level detector circuit means to receive said level detector output signal, said output circuit means producing the timer circuit output signal, said timer circuit output signal continuing as long as said level detector output signal continues and for the adjustable predetermined dropout time period after the input signal is terminated.

15. A timer circuit in accordance with claim 14 in which said first variable resistance means is coupled between said positive voltage source and said inverting input for adjusting the value of said negative slope.

16. A timer circuit in accordance with claim 15 in which said control circuit means includes an inverter for receiving the input signal, the output of said inverter being coupled to said inverting input of said first operational amplifier through a first diode, the junction between said inverter and the anode of said first diode being coupled to said positive voltage source through said first variable resistance means, the junction between the cathode of said first diode and said inverting input of said first operational amplifier being coupled through a second diode and a second resistor to said negative voltage source, the junction between the cathode of said second diode and said second resistor being coupled to the collector of a PNP transistor, the emitter of said PNP transistor being coupled to ground potential, the input of said inverter being coupled to said negative voltage source through a voltage divider with the base of said PNP transistor being coupled to a first point on said voltage divider, a second point on said voltage divider being coupled to receive said truncating signal, said second point being relatively positive with respect to said first point.

17. A timer circuit in accordance with claim 16 in which said level detector circuit means comprises a second operational amplifier with its non inverting amplifier coupled to ground potential, the inverting input of said second operational amplifier coupled through second variable resistance means to receive said ramping voltage output signal, the junction between said inverting input of said second operational amplifier and said second variable resistance means being coupled by a third resistor to said negative voltage source, wherein the value of said second variable resistance means determines said predetermined threshold value.

18. A timer circuit in accordance with claim 17 in which said output circuit means includes third variable resistance means coupled to a second capacitor and in which the dropout time of said timer circuit is related to the value of said third variable resistance means.

19. A timer circuit in accordance with claim 18 in which a separate one of said signal processing means and said control circuit means is provided for each one of said separate input signals with said level detector circuit means coupled to receive the largest value of said ramping voltage output signals of each of said signal processing means, wherein, said first variable resistance means is common to each of said control circuit means for providing said simultaneous adjustment of said steady state pickup time for all of said separate inputs, said level detector circuit means includes said second variable resistance means for adjusting said predetermined threshold value thereby providing said simultaneous adjustment of said transient pickup time for all of said separate inputs, and said output circuit means includes said third variable resistance means for providing said simultaneous adjustment of said dropout time for all of said separate inputs.

* * * * *